US008621757B2

(12) United States Patent
Akari et al.

(10) Patent No.: US 8,621,757 B2
(45) Date of Patent: Jan. 7, 2014

(54) COATED CUTTING EDGE OF A BLADE MEMBER

(75) Inventors: Koichiro Akari, Takasago (JP); Hiroshi Ohtsubo, Seki (JP)

(73) Assignee: Kai R&D Center Co., Ltd., Gifu-ken (JP)

( * ) Notice: Subject to any disclaimer, the term of this patent is extended or adjusted under 35 U.S.C. 154(b) by 728 days.

(21) Appl. No.: 12/449,508

(22) PCT Filed: Mar. 27, 2008

(86) PCT No.: PCT/JP2008/055830
§ 371 (c)(1),
(2), (4) Date: Aug. 11, 2009

(87) PCT Pub. No.: WO2008/123341
PCT Pub. Date: Oct. 16, 2008

(65) Prior Publication Data
US 2010/0024222 A1 Feb. 4, 2010

(30) Foreign Application Priority Data
Mar. 30, 2007 (JP) ................................ 2007-091252

(51) Int. Cl.

| | |
|---|---|
| ***B26B 21/54*** | (2006.01) |
| ***B21K 11/00*** | (2006.01) |
| ***G11B 5/64*** | (2006.01) |
| ***B32B 9/00*** | (2006.01) |
| ***B32B 19/00*** | (2006.01) |

(52) U.S. Cl.
USPC ........ 30/346.54; 76/104.1; 428/336; 428/697

(58) Field of Classification Search
USPC .................. 30/346.53, 345.54, 350; 428/634, 428/697–699, 469, 472, 336, 704; 76/104.1
See application file for complete search history.

(56) References Cited

U.S. PATENT DOCUMENTS 3,911,579 A * 10/1975 Lane et al. ................. 30/346.54
4,492,522 A * 1/1985 Rossmann et al. ........ 416/241 R
(Continued)

FOREIGN PATENT DOCUMENTS

EP 1 287 953 A1 3/2003
JP A-04-128363 4/1992
(Continued)

OTHER PUBLICATIONS

International Preliminary Report on Patentability issued from the International Bureau of WIPO on Oct. 13, 2009 in the corresponding International patent application No. PCT/JP2008/055830.

(Continued)

*Primary Examiner* — Ghassem Alie
*Assistant Examiner* — Bharat C Patel
(74) *Attorney, Agent, or Firm* — Posz Law Group, PLC

(57) ABSTRACT

In a cutting edge of a razor blade, a non-nitrided layer containing Ti, Al, and Cr formed on opposite surfaces of a base plate as a portion of a coating layer. A remaining layer containing Ti, Al, Cr, and N formed on opposite surfaces of the non-nitrided layer as a portion of a nitrided layer of the coating layer. A surface layer containing Ti, Al, Cr, and N formed on opposite surfaces of the remaining layer as a portion of the nitrided layer of the coating layer. A fluororesin layer formed on opposite surfaces of the surface layer with a bonding layer containing Cr and Al in between. The coating layer further improves the cutting edge, enhances cutting performance of the cutting edge, and maintains the enhanced cutting performance to improve the durability of the cutting edge.

14 Claims, 6 Drawing Sheets

(56) References Cited

U.S. PATENT DOCUMENTS

| | | | | |
|---|---|---|---|---|
| 4,745,035 | A * | 5/1988 | Saurer et al. | 428/614 |
| 4,839,245 | A * | 6/1989 | Sue et al. | 428/698 |
| 5,669,144 | A * | 9/1997 | Hahn et al. | 30/346.54 |
| 5,952,085 | A * | 9/1999 | Rickerby et al. | 428/216 |
| 6,330,750 | B1 * | 12/2001 | Meckel | 30/350 |
| 7,217,466 | B2 * | 5/2007 | Weber et al. | 428/697 |
| 7,581,933 | B2 * | 9/2009 | Bruce et al. | 416/241 R |
| 7,913,402 | B2 * | 3/2011 | Buchtmann et al. | 30/350 |
| 2004/0099120 | A1 * | 5/2004 | Yamada et al. | 83/835 |
| 2004/0137237 | A1 * | 7/2004 | Stachowiak | 428/434 |
| 2004/0166378 | A1 * | 8/2004 | Ge | 428/698 |
| 2005/0186343 | A1 * | 8/2005 | Ge | 427/248.1 |
| 2005/0276990 | A1 * | 12/2005 | Kohara et al. | 428/469 |
| 2006/0018760 | A1 * | 1/2006 | Bruce et al. | 416/229 A |
| 2006/0277767 | A1 | 12/2006 | Sun et al. | |
| 2007/0284255 | A1 * | 12/2007 | Gorokhovsky et al. | 205/89 |
| 2010/0104840 | A1 * | 4/2010 | Blacker et al. | 428/216 |

FOREIGN PATENT DOCUMENTS

| | | |
|---|---|---|
| JP | A-2001-340672 | 12/2001 |
| JP | A-2003-071610 | 3/2003 |
| JP | A-2003-305601 | 10/2003 |
| JP | A-2006-518632 | 8/2006 |
| JP | A-2007-61212 | 3/2007 |
| WO | WO 2004/074538 | 9/2004 |
| WO | WO 2005/005110 A1 | 1/2005 |

OTHER PUBLICATIONS

International Search Report mailed on Jul. 8, 2008 for the corresponding International patent application No. PCT/JP2008/055830.

Extended European Search Report dated Apr. 19, 2012 in corresponding EP Patent Application No. 08738980.5.

* cited by examiner

COATED CUTTING EDGE OF A BLADE MEMBER

CROSS REFERENCE TO RELATED APPLICATIONS

This application is a U.S. national stage application of PCT/JP2008/055830 filed on Mar. 27, 2008, and claims priority to, and incorporates by reference, Japanese Patent Application No. 2007-091252 filed on Mar. 30, 2007.

FIELD OF THE INVENTION

The present invention relates to a cutting edge having a coating layer of various types of blade members such as razor blades or microtome blades.

BACKGROUND OF THE INVENTION

Conventionally, various types of coating processes are performed on surface layers of cutting edges of razor blades or microtome blades. By way of example, in Patent Document 1, a DLC (diamond-like carbon) layer is formed on a base plate with a predetermined intermediate layer in between.

Patent Document 1: Japanese Laid-Open Patent Publication No. 2001-340672

SUMMARY OF THE INVENTION

According to Patent Document 1, by providing a DLC layer on a base plate with a predetermined intermediate layer in between, cutting performance of the cutting edge is improved. Also, the improved cutting performance is maintained to enhance the durability of the cutting edge. Accordingly, it is an objective of the present invention to further improve the cutting edge.

In accordance with a first aspect of the present invention, a blade member in which a surface of a base plate forming a cutting edge is coated with a coating layer is provided. The coating layer includes a non-nitrided layer coating the surface of the base plate and a nitrided layer coating a surface of the non-nitrided layer.

In this case, the nitrided layer is bonded with improved adhesion and prevented from peeling off. The cutting edge is thus improved and cutting performance of the cutting edge is enhanced. The enhanced cutting performance is maintained to improve the durability of the cutting edge.

The hardness of the nitrided layer is preferably greater than the hardness of the non-nitrided layer. The non-nitrided layer preferably contains Ti, Al, and Cr. The relative proportion of Ti, Al, and Cr of the non-nitrided layer preferably varies along the direction of the film thickness. In these cases, the coating layer of the cutting edge 2 has an increased toughness so that deformation of the cutting edge 2 is reduced.

The nitrided layer preferably contains Ti, Al, Cr, and N. A relative proportion of Ti, Al, Cr, and N of the nitrided layer preferably varies along the direction of the film thickness. The relative proportion of Ti, Al, Cr, and N is preferably constant at a predetermined depth from the surface layer of the nitrided layer. In these cases, Ti and Al have antibacterial effects.

Neither the non-nitrided layer nor the nitrided layer preferably contains O, B, or C. In this case, the composition of the non-nitrided layer and the composition of the nitrided layer are simplified.

The width between surfaces of the base plate forming the cutting edge on opposite sides of the direction of the thickness of the base plate preferably becomes smaller toward a point of the cutting edge. In the coating layer coating the two surfaces of the base plate, a portion the nitrided layer is preferably removed from at least one of both sides of the direction of the thickness such that the nitrided layer has a remaining layer including a surface extending from the point of the cutting edge. In this case, the remaining layer, which is formed by removing a portion of the coating layer to sharpen the cutting edge, improves the cutting edge and enhances the cutting performance of the cutting edge.

The nitrided layer preferably has a plurality of remaining layers that are stacked together. In this case, even if the film thickness of the coating layer is increased, the cutting edge is sharpened.

At least one of opposite surfaces of the remaining layer of the nitrided layer is formed by a first surface and a second surface, the first surface extending from the point of the cutting edge and the second surface extending from the first surface. A cutting edge angle $\beta a$ defined by two first surfaces is greater than a cutting edge angle $\beta b$ defined by two second surfaces. In this case, sharpening of the cutting edge having the coating layer is facilitated.

The nitrided layer preferably has a surface layer coating a surface of the remaining layer. In this case, the sharpness of the cutting edge is adjusted by means of the surface layer.

The width between surfaces of the base plate forming the cutting edge on both sides of the direction of the thickness of the base plate preferably becomes smaller toward a point of the cutting edge, and a surface extending from the point of the cutting edge is preferably formed by removing a portion of at least one of the two surfaces of the base plate. In this case, sharpening of the cutting edge is facilitated by removing the portion of the base plate. This improves the cutting performance of the cutting edge.

In this case, removal of the base plate is facilitated. At least one of the opposite surfaces of the base plate is preferably formed by a first surface and a second surface, the first surface extending from the point of the cutting edge and the second surface extending from the first surface, and a cutting edge angle $\alpha a$ defined by two first surfaces is preferably greater than a cutting edge angle $\alpha b$ defined by two second surfaces.

A fluororesin layer is preferably provided on a surface side of the nitrided layer of the coating layer. In this case, the fluororesin layer allows easier sliding of the cutting edge, further improving the cutting performance of the cutting edge.

A surface of the nitrided layer is preferably coated with a bonding layer and that the fluororesin layer coats a surface of the bonding layer. In this case, by means of the bonding layer, the roughness of the surface on which the fluororesin layer is formed is adjusted in such a manner as to increase the adhesion between the fluororesin layer and the bonding layer. The fluororesin layer 6 is thus prevented from peeling off from the surface of the nitrided layer.

The ratio of numbers of atoms a:b:c (a+b+c=1) of Ti, Al, and Cr is preferably set in such a manner as to satisfy $0.02 \leq a \leq 0.30$, $0.55 \leq b \leq 0.765$, and $0.06 \leq c$. In this case, the hardness is increased.

The base plate is preferably a base plate forming a cutting edge of a razor blade or a microtome blade.

The formation of the coating layer is preferably performed through at least one of a sputtering method, a vapor deposition method, an ion plating method, and a chemical vapor deposition method. In this case, the coating layer is easily formed.

BRIEF DESCRIPTION OF THE DRAWINGS

FIG. 2(*c*) is a schematic view representing a step of forming a non-nitrided layer of a coating layer of the cutting edge of the razor blade of the first embodiment;

FIG. 4(*b*) is a schematic view representing a step of forming a bonding layer of the cutting edge of the razor blade of the first embodiment;

FIG. 4(*c*) is a schematic view representing a step of forming a fluororesin layer of the cutting edge of the razor blade of the first embodiment;

FIG. 5(*d*) is a schematic view representing a step of forming a non-nitrided layer of a coating layer of the cutting edge of the razor blade of the second embodiment;

FIG. 7(*b*) is a schematic view representing a step of forming a bonding layer of the cutting edge of the razor blade of the second embodiment;

FIG. 7(*c*) is a schematic view representing a step of forming a fluororesin layer of the cutting edge of the razor blade of the second embodiment;

FIGS. 8(*b*), 8(*c*), and 8(*d*) are schematic views each representing a coating layer of a cutting edge of modifications of the first and second embodiments.

DETAILED DESCRIPTION OF THE INVENTION

A first embodiment of the present invention illustrated in FIGS. 1, 2, 3, 4, and 8(*a*) and a second embodiment of the invention shown in FIGS. 1, 5, 6, 7, and 8(*a*) will now be described.

Figure 1:
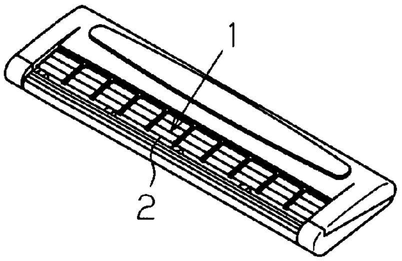
FIG. 1 is a perspective view showing a razor with a razor blade according to first and second embodiments.
Figures 4A, 4B, 4C:
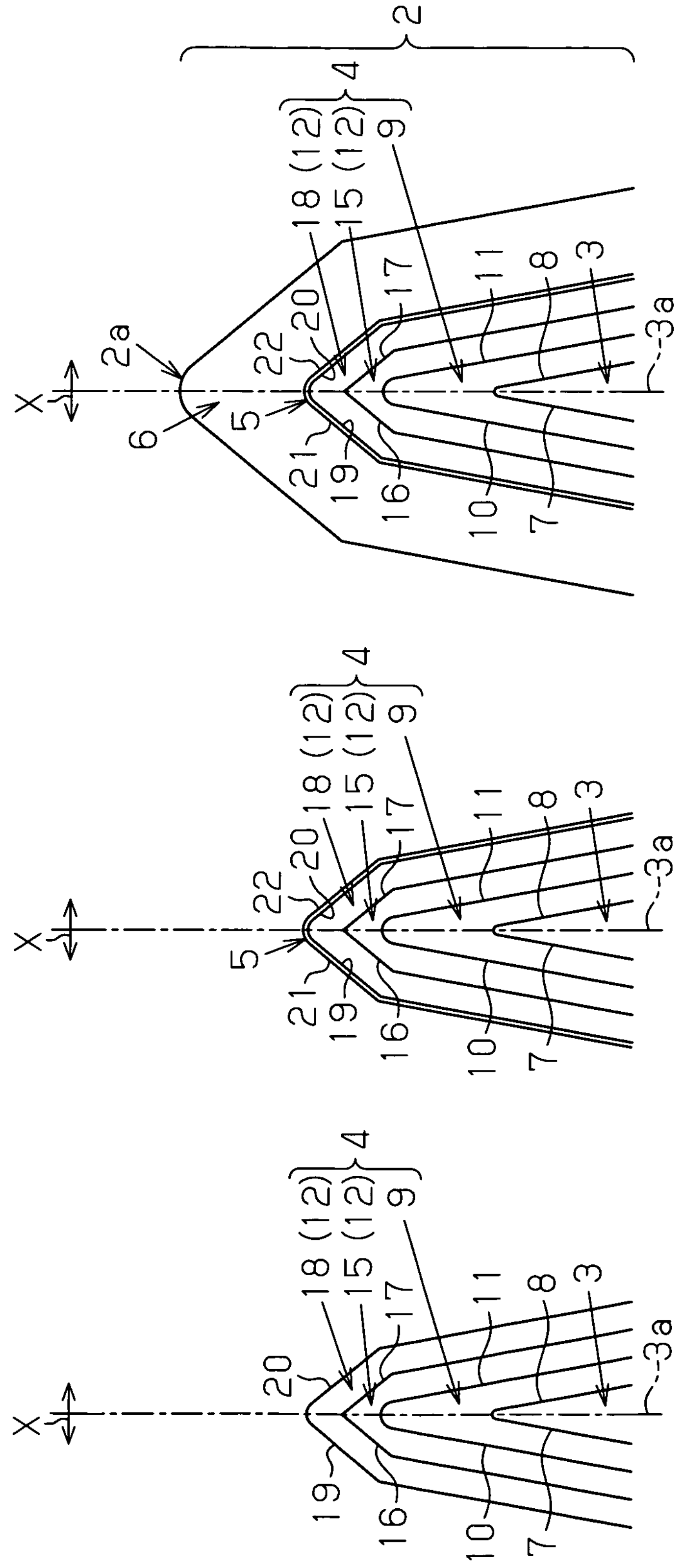
FIG. 4(*a*) is a schematic view representing a step of forming a nitrided layer (a surface layer) of the coating layer of the cutting edge of the razor blade of the first embodiment.
Figure 5A:
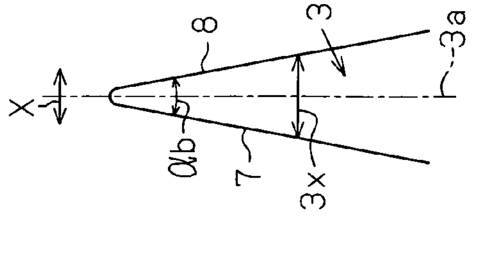
FIGS. 5(*a*), 5(*b*), and 5(*c*) are schematic views each representing a step of forming a base plate of a cutting edge of a razor blade according to the second embodiment.
Figure 5B:
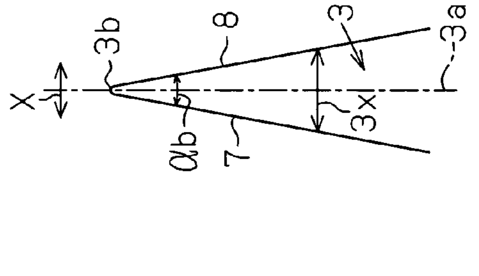
Figure 5C:
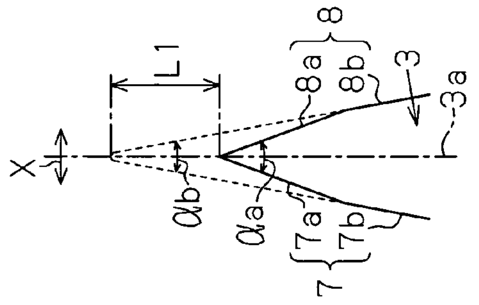
Figure 5D:
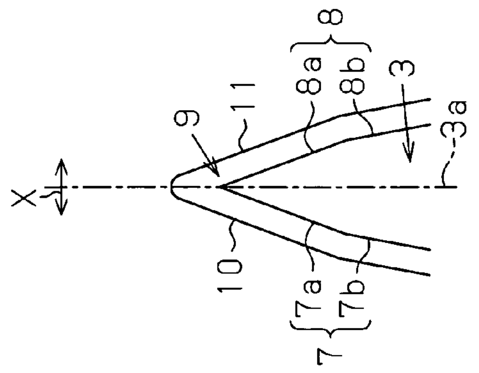
Figure 7A:
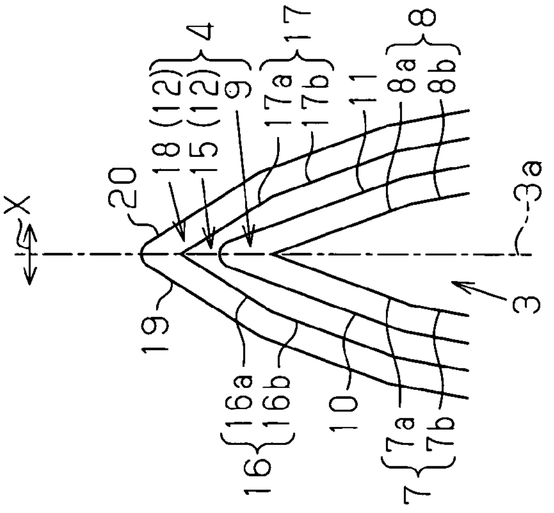
FIG. 7(*a*) is a schematic view representing a step of forming a nitrided layer (a surface layer) of the coating layer of the cutting edge of the razor blade of the second embodiment.
Figure 7B:
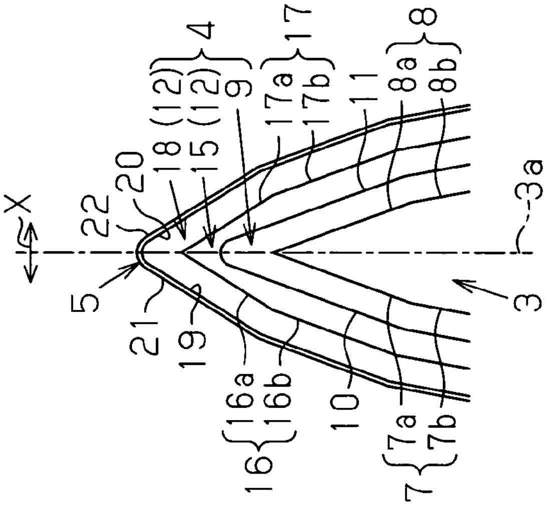
Figure 7C:
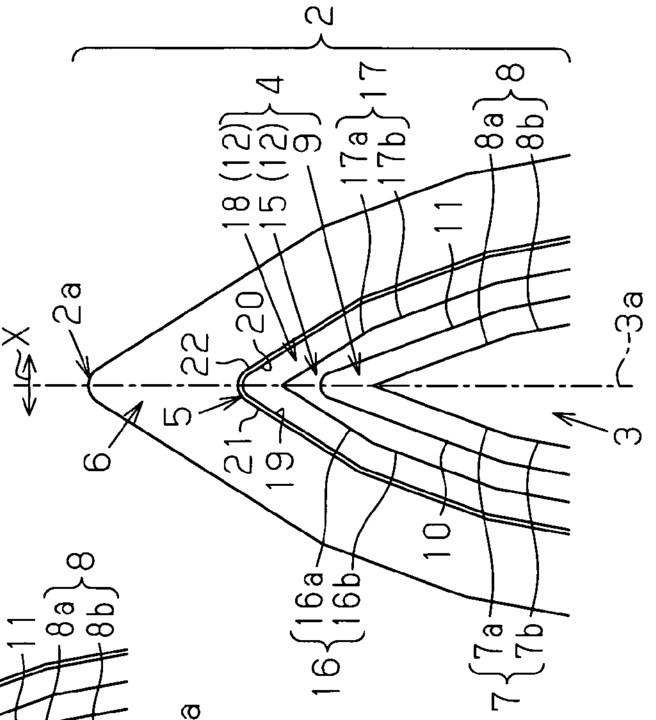
Figure 8A:
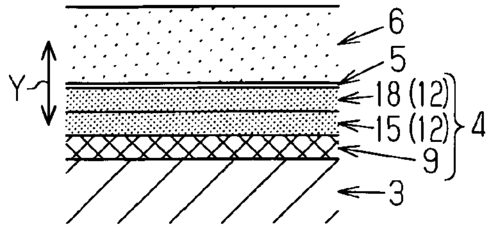
FIG. 8(*a*) is a schematic view showing the coating layer of the cutting edge of the first and second embodiments.
Figure 8B:
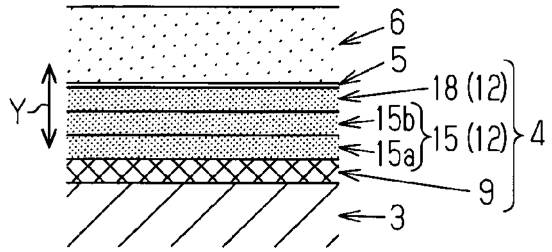
Figure 8C:
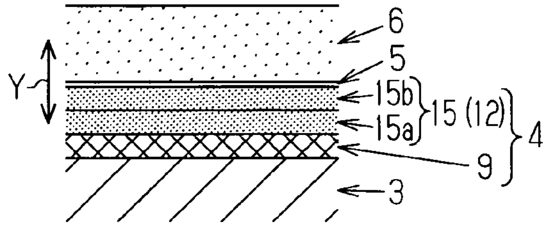
Figure 8D:
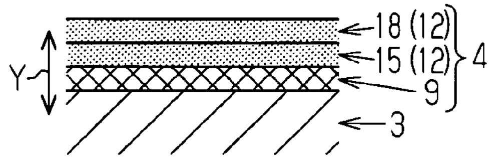

In a cutting edge 2 of a razor blade 1 shown in FIG. 1, a base plate 3 is coated with a coating layer 4, as illustrated in FIGS. 4(*c*) and 8(*a*) or FIGS. 7(*c*) and 8(*a*). A fluororesin layer 6 is formed on the coating layer 4 with a bonding layer 5 in between. The cutting edge 2 is formed through the steps described below.

Figure 2A:
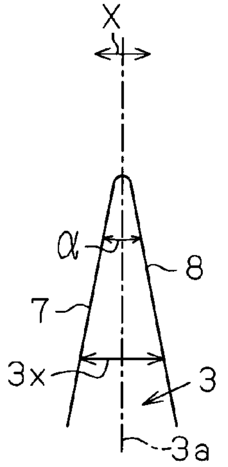
FIGS. 2(*a*) and 2(*b*) are schematic views each representing a step of forming a base plate of a cutting edge of a razor blade according to the first embodiment.
Figure 2B:
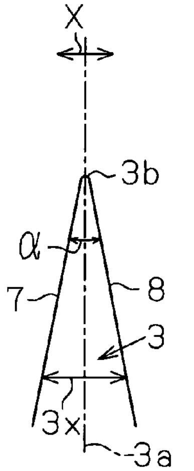
Figure 2C:
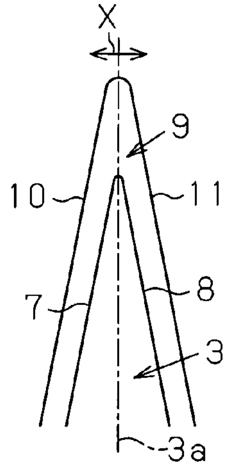

In the first embodiment, as illustrated in FIG. 2(*a*), the base plate 3 is sharpened through grinding in such a manner that a width 3x between a pair of surfaces 7, 8 located on both sides of a width direction X of the base plate 3 becomes smaller toward a point 2*a* of the cutting edge 2. In this manner, the surfaces 7, 8 are both inclined with respect to an axis 3*a*, which extends along the center of the base plate 3 in the width direction X.

In the second embodiment illustrated in FIG. 5(*a*), sharpening through grinding is performed in the same manner as the first embodiment. The base plate 3 is formed of a material suitable for the cutting edge 2 of the razor blade 1, such as metal including carbon steel, stainless steel, or aluminum alloy, fine ceramics including zirconium, and alumina or cemented carbide (WC).

In the first embodiment, as illustrated in FIG. 2(*b*), the surfaces 7, 8 of the base plate 3, which have been sharpened through grinding, are subjected to finish polishing.

Although finish polishing is carried out in the second embodiment illustrated in FIG. 5(*b*) as in the case of the first embodiment, this process may be omitted. It is preferred that a cutting edge angle α defined by the surfaces 7, 8 be 16 to 22 degrees. After the finish polishing, the point 3*b* of the base plate 3 is formed along an arc having a radius of 20 to 30 nm.

In the second embodiment, as illustrated in FIG. 5(*c*), the surfaces 7, 8 are removed from the base plate 3 after the finish polishing and final sharpening is performed on the base plate 3. For example, a portion of each of the surfaces 7, 8 extending from the point 2*a* of the cutting edge 2 is removed to form a pair of first surfaces 7*a*, 8*a* (surfaces sharpened through the removal). A cutting edge angle αa (>αb) defined by the first surfaces 7*a*, 8*a* is greater than a cutting edge angle αb defined by second surfaces 7*b*, 8*b* (surfaces remaining after the removal) extending from the corresponding first surfaces 7*a*, 8*b*.

Although not illustrated, the cutting edge angle αa defined by the first surfaces 7*a*, 8*a* and the cutting edge angle αb (=αa) defined by the second surfaces 7*b*, 8*b* may be equal so that the first surfaces 7*a*, 8*a* and the corresponding second surfaces 7*b*, 8*b* are flush with each other.

Alternatively, the cutting edge angle αb (>αa) defined by the second surfaces 7*b*, 8*b* may be greater than the cutting edge angle αa defined by the first surfaces 7*a*, 8*a*. The aforementioned removal is accomplished through a dry etching method such as the sputter etching method. It is preferred that the dimension L1 of the removed portion be 10 to 200 nm. It is also preferred that the cutting edge angle αb be 17 to 25 degrees and the cutting edge angle αa be 17 to 30 degrees.

In the first embodiment illustrated in FIG. 2(*c*) or the second embodiment shown in FIG. 5(*d*), the surfaces 7, 8 of the base plate 3 is coated with a non-nitrided layer 9 having a film thickness of 30 to 70 nm, which is a portion of the coating layer 4. The non-nitrided layer 9 does not contain O (oxygen), B (boron), or C (carbon), but contains Ti (titanium), Al (aluminum), and Cr (Chromium). Specifically, the composition of the non-nitrided layer 9 is Ti—Al—Cr. The relative proportion of Ti, Al, and Cr varies along a film thickness direction Y. For example, the ratio of numbers of atoms a:b:c (a+b+c=1) of Ti, Al, and Cr of the non-nitrided layer 9 is set in such a manner as to satisfy $0.25 \leq a \leq 0.75$, $0.25 \leq b \leq 0.75$, and c=0 and preferably to a substantially constant ratio of 0.5:0.5:0 in the range from the surfaces 7, 8 of the base plate 3 to the point corresponding to the film thickness of 5 to 20 nm.

In the range corresponding to the film thickness of 30 to 70 nm, the ratio of numbers of atoms a, b, and c are set in such a manner as to satisfy $0.02 \leq a \leq 0.30$, $0.55 \leq b \leq 0.765$, and $0.06 \leq c$, respectively, and the ratio of number of atoms a:b:c is set to, preferably, 0.20:0.70:0.10. Alternatively, the ratio of number of atoms of the non-nitrided layer 9 may be set substantially constant in the range from the surfaces 7, 8 of the base plate 3 to the point corresponding to the film thickness of 30 to 70 nm in the entire film thickness direction Y.

Figure 3A:
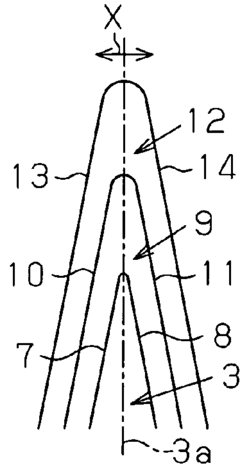
FIGS. 3(*a*) and 3(*b*) are schematic views each representing a step of forming a nitrided layer (a remaining layer) of the coating layer of the cutting edge of the razor blade of the first embodiment.
Figure 3B:
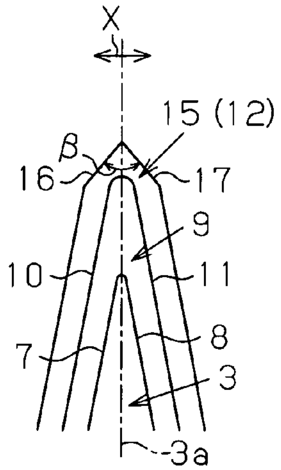
Figure 6A:
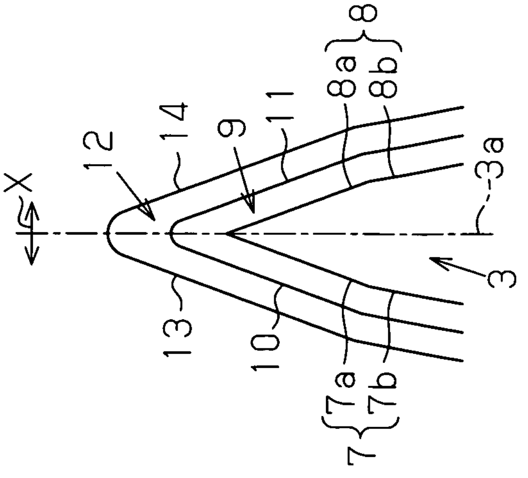
FIGS. 6(*a*), 6(*b*), and 6(*c*) are schematic views each representing a step of forming a nitrided layer (a remaining layer) of the coating layer of the cutting edge of the razor blade of the second embodiment.
Figure 6B:
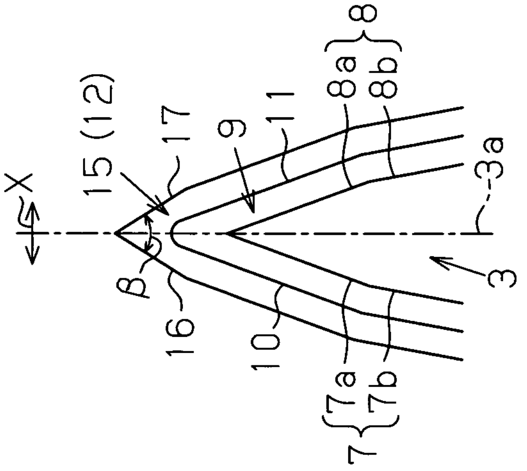
Figure 6C:
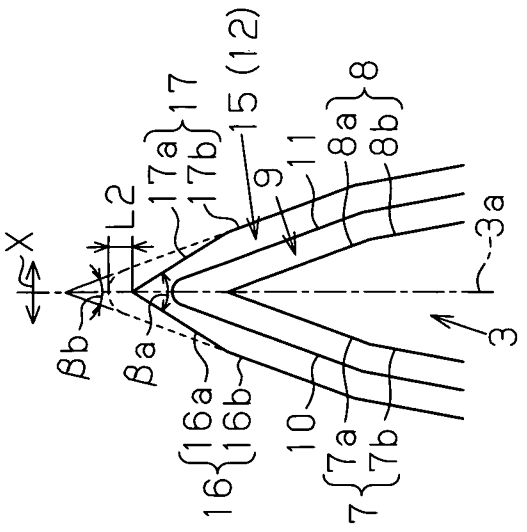

In the first embodiment illustrated in FIG. 3(*a*) or the second embodiment illustrated in FIG. 6(*a*), opposite surfaces 10, 11 of the non-nitrided layer 9 are coated with a nitrided layer 12 of a film thickness of 50 to 90 nm, which is a portion of the coating layer 4. The nitrided layer 12 does not contain O (oxygen), B (boron), or C (carbon) but contains Ti, Al, Cr, and N (nitrogen). Specifically, the composition of the nitrided layer 12 is Ti—Al—Cr—N. The hardness of the nitrided layer 12 is greater than or equal to approximately Hv 2800 in the entire portion of the nitrided layer 12, particularly, in the vicinity of the surfaces 13, 14 of the nitrided layer 12, and is greater than the hardness of the non-nitrided layer 9. The relative proportion of Ti, Al, Cr, and N is set substantially constant in the entire film thickness direction Y, particularly at a predetermined depth from the surfaces 13, 14. The relative proportion may vary with respect to the film thickness direction Y. For example, the ratio of number of atoms a:b:c (a+b+c=1) of Ti, Al, and Cr of the nitrided layer 12, except for nitrogen N, is set in such a manner as to satisfy $0.02 \leq a \leq 0.30$, $0.55 \leq b \leq 0.765$, $0.06 \leq c$. It is preferred that the ratio of numbers of atoms a:b:c be set to 0.20:0.70:0.10. Also, it is preferred that the ratio of numbers of atoms (a+b+c=1):d between the combination of Ti, Al and Cr, and N (nitrogen) be set in such a manner as to satisfy $0.5 \leq d \leq 1$.

In the first embodiment illustrated in FIG. 3(*b*), a portion of each of the surfaces 13, 14 of the nitrided layer 12 is removed by the amount corresponding to a film thickness of 20 to 60 nm to form a remaining layer 15. In the second embodiment shown in FIG. 6(*b*), the remaining layer 15 is formed in the same manner as the first embodiment. It is preferred that a cutting edge angle β defined by opposite surfaces 16, 17 of the remaining layer 15 be 30 to 120 degrees.

In the second embodiment, as illustrated in FIG. 6(*c*), a portion of each surface 16, 17 of the remaining layer 15 extending from the point 2*a* of the cutting edge 2 is removed to form first surfaces 16*a*, 17*a* (surfaces sharpened through such removal). A cutting edge angle βa defined by the first surfaces 16*a*, 17*a* is greater than a cutting edge angle βb defined by second surfaces 16*b*, 17*b* (surfaces that remain coated after the removal) extending from the corresponding first surfaces 16*a*, 17*a*. Although not illustrated, the cutting edge angle βa defined by the first surfaces 16*a*, 17*a* and the cutting edge angle βb (=βa) defined by the second surfaces 16*b*, 17*b* may be equal so that each one of the first surfaces 16*a*, 17*a* and the corresponding one of the second surfaces 16*b*, 17*b* are flush with each other. Alternatively, the cutting edge angle βb (>βa) defined by the second surfaces 16*b*, 17*b* may be greater than the cutting edge angle βa defined by the first surfaces 16*a*, 17*a*.

The aforementioned removal is accomplished through a dry etching method such as a sputter etching method. It is preferred that the dimension L2 of the removed portion be 5 to 150 nm. It is also preferred that the cutting edge angle βb be 17 to 30 degrees and the cutting edge angle βa be 30 to 120 degrees.

In the first embodiment shown in FIG. 4(*a*) or the second embodiment illustrated in FIG. 7(*a*), a surface layer 18 having a film thickness of 10 to 40 nm coats the surfaces 16, 17 of the remaining layer 15 as a portion of the coating layer 4. The surface layer 18 does not contain O (oxygen), B (boron), or C (carbon), but contains Ti, Al, Cr, and N. The surface layer 18 and the remaining layer 15 have the same compositions. The ratio between the film thickness of the nitrided layer 12 formed by the remaining layer 15 and the surface layer 18 and the film thickness of the non-nitrided layer 9 is preferably in the range from 1:1 to 2:1.

In the first embodiment illustrated in FIG. 4(*b*) or the second embodiment shown in FIG. 7(*b*), opposite surfaces 19, 20 of the surface layer 18 are coated with a bonding layer 5 having a film thickness of 1 to 6 nm. The bonding layer 5 is formed of Cr or Al. The point of the bonding layer 5 is formed along an arc having a radius of 25 to 35 nm.

In the first embodiment shown in FIG. 4(*c*) or the second embodiment illustrated in FIG. 7(*c*), a fluororesin layer 6 having a film thickness of 200 to 500 nm coats opposite surfaces 21, 22 of the bonding layer 5. As the fluororesin, polytetrafluoroethylene (Teflon (registered trademark)) or the like is employed.

The non-nitrided layer 9, the nitrided layer 12, the remaining layer 15, the surface layer 18, and the bonding layer 5, which have been described above, are formed through at least one of various types of conventionally known thin film forming methods including sputtering methods such as high-frequency sputtering, high-speed low-temperature sputtering (magnetron sputtering), and reactive sputtering, various types of vapor deposition methods, various types of ion plating methods, and various types of chemical vapor deposition methods (CVD).

For the purpose of consideration about the cutting edge 2 of the razor blade 1 having the coating layer 4, sample A of the cutting edge 2 of the razor blade 1 was manufactured as described below.

As shown in FIG. 2(*a*), a stainless steel base plate 3 was sharpened through grinding using a rough whetstone and the cutting edge angle α between opposite surfaces 7, 8 was set to 16 to 22 degrees. As illustrated in FIG. 2(*b*), the surfaces 7, 8 of the stainless steel base plate 3, which had been subjected to grinding and sharpening, were finished through stropping. With reference to FIG. 2(*c*), after the stropping, the surfaces 7, 8 of the stainless steel base plate 3 as a portion of the coating layer 4 was coated with the non-nitrided layer 9 through sputtering. In this case, the film thickness of the non-nitrided layer 9 was approximately 50 nm.

Subsequently, as illustrated in FIG. 3(*a*), the surfaces 10, 11 of the non-nitrided layer 9 were coated with the nitrided layer 12 through sputtering. In this case, the film thickness of the non-nitrided layer 12 was approximately 70 nm. With reference to FIG. 3(*b*), a portion of the nitrided layer 12 was removed by the amount corresponding to approximately 40 nm through sputter etching to sharpen the remaining layer 15, which was formed as a portion of the coating layer 4. In this case, the cutting edge angle β between the opposite surfaces 16, 17 was approximately 80 degrees.

Next, with reference to FIG. 4(*a*), the surface layer 18 was formed on the surfaces 16, 17 of the remaining layer 15 through sputtering as a portion of the coating layer 4 to coat the remaining layer 15. In this case, the film thickness of the surface layer 18 was approximately 30 nm. As illustrated in FIG. 4(*b*), the opposite surfaces 19, 20 of the surface layer 18 were coated with the bonding layer 5. In this case, the film thickness of the bonding layer 5 was approximately 4 nm. With reference to FIG. 4(*c*), the opposite surfaces 21, 22 of the bonding layer 5 were coated with the fluororesin layer 6. In this case, the film thickness of the fluororesin layer 6 was approximately 300 nm.

Other samples B, C of the cutting edge 2 of the razor blade 1 were made. In sample B, the entire portion of the layer corresponding to the non-nitrided layer 9 of sample A was 100% Cr and the entire layer corresponding to the nitrided layer 12 (the remaining layer 15 and the surface layer 18) was 100% DLC. In sample C, the entire layer corresponding to the coating layer 4 (the non-nitrided layer 9, the remaining layer 15, and the surface layer 18) was 100% Cr. Table 1 and table 2 represent the results of comparison of properties of samples A, B, and C. The conditions of the cutting edges 2 of the razor blades 1 of samples A, B, and C, such as the film thicknesses of the coating layers or the cutting edge angles, were uniform.

A cutting performance test was performed by successively cutting an elongated wool felt piece having a uniform cross section for a certain number of times using the cutting edge 2 of each of the three types of samples (samples A, B, and C). For each sample, the initial cut resistance and the final cut resistance were measured and the increase of the cut resistance was obtained. As a result, samples A and B both exhibited smaller initial cut resistances, smaller final cut resistances, and smaller increase than sample C. Also, the initial cut resistance, the final cut resistance, and the increase of sample A were smaller than the corresponding values of sample B. It was thus demonstrated that, by forming the coating layer 4 in a layered configuration including the non-nitrided layer 9 and the nitrided layer 12 (the remaining layer 15 and the surface layer 18) as in the case of sample A, the cut resistance was reduced and the reduced cut resistance was maintained, thus improving durability.

TABLE 1

| | Initial cutting a (mN) | Final cutting b (mN) | Increase (mN) |
|---|---|---|---|
| Sample C | 365 × 9.8 | 700 × 9.8 | 335 × 9.8 |
| Sample B | 320 × 9.8 | 650 × 9.8 | 330 × 9.8 |
| Sample A | 310 × 9.8 | 610 × 9.8 | 300 × 9.8 |

After the above-described cutting performance test, the cutting edges 2 of the three types of samples (samples A, B, and C) were observed with an SEM (a scanning electron microscope). Specifically, the number of the portions in which deformation greater than or equal to 1 μm of the extending direction of the cutting edge 2 was counted in the range corresponding to 1 mm of the extending direction at a given position of the cutting edge 2. Table 2 shows the results. As is clear from Table 2, sample A and sample B had smaller numbers of deformed portions than sample C. Also, the number of the deformed portions of sample A was smaller than that of sample B. It was thus demonstrated that sample A had improved toughness.

TABLE 2

| | Number of Deformed Portions |
|---|---|
| Sample C | 12 |
| Sample B | 8 |
| Sample A | 5 |

Further, use tests were performed on the three types of cutting edges 2 (the cutting edges 2 of samples A, B, and C) by test subjects (ten subjects) who were selected at random. The cutting edges 2 were set in typical T shaped razors having identical configurations. After the test subjects used the T shaped razors, sensory assessment was carried out by scoring the initial cutting performance out of ten points (higher scores for better cutting performance). The averages of these scores were then compared. As a result, higher averages were marked in the order of sample A (average 7.7 point), sample B (average 7.4 points), and sample C (average 7.3 points).

By comprehensively judging from the above-described findings, sample A, which includes the coating layer 4 having the layered structure formed by the non-nitrided layer 9 and the nitrided layer 12 (the remaining layer 15 and the surface layer 18), improved the cutting edge 2 of the razor blade 1, enhanced the cutting performance of the cutting edge 2, and maintained the enhanced cutting performance, This improved durability and toughness of the cutting edge 2.

The illustrated embodiments have the following advantages.

Since the coating layer 4 of the cutting edge 2 has a double layer structure formed by the non-nitrided layer 9 and the nitrided layer 12, the nitrided layer 12 is bonded with increased adhesion and prevented from peeling off. This improves the cutting edge 2, enhances the cutting performance of the cutting edge, and maintains the improved cutting performance, thus enhances the durability of the cutting edge 2.

The hardness of the nitrided layer 12 containing Ti, Al, Cr, and N is greater than the hardness of the non-nitrided layer 9 containing Ti, Al, and Cr. This improves the toughness of the coating layer 4 of the cutting edge 2 and reduces deformation of the cutting edge 2.

The remaining layer 15 formed in the nitrided layer 12 improves the sharpness of the cutting edge 2. As a result, the cutting edge 2 is improved and has enhanced cutting performance.

The surface layer 18 coating the remaining layer 15 in the nitrided layer 12 adjusts the sharpness of the cutting edge 2.

The nitrided layer 12 of the coating layer 4 is coated with the fluororesin layer 6 with the bonding layer 5 in between. The fluororesin layer 6 facilitates sliding of the cutting edge 2 when in use, further improving the cutting performance of the cutting edge 2. Also, the roughness of the surface coated with the fluororesin layer 6 is adjusted by means of the bonding layer 5 so that the fluororesin layer 6 is bonded with improved adhesion and prevented from peeling off.

The present invention may be configured in the forms described below other than the illustrated embodiments.

Modification 1, which is shown in FIG. 8(*b*), is different from the first and second embodiments in that the remaining layer 15 is formed by a plurality of (two, inner and outer) of remaining layers 15*a*, 15*b*, which are stacked together.

In modification 2 illustrated in FIG. 8(*c*), the remaining layer 15 is formed by a plurality of (two, inner and outer) remaining layers 15*a*, 15*b*, which are stacked together, and the surface layer 18 is omitted. That is, the outer remaining layer 15*b*, which is also the surface layer, is coated with the bonding layer 5. In this manner, the modification is different from the first and second embodiments.

Modification 3, as shown in FIG. 8(*d*), is different from the first and second embodiments in that the bonding layer 5 and the fluororesin layer 6 are omitted.

Figure 9:
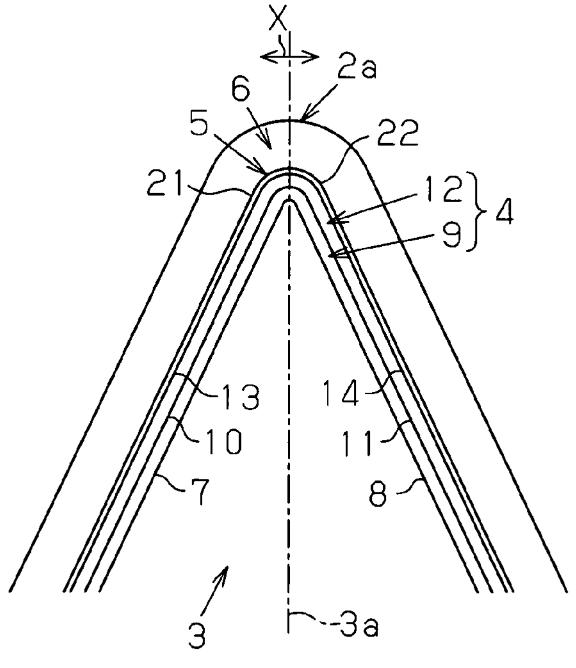
FIG. 9 is a schematic view corresponding to FIG. 4(*c*) or 7(*c*), showing a cutting edge of a microtome blade according to a third embodiment.

A third embodiment of the present invention, which is illustrated in FIG. 9, is embodied as a cutting edge 2 of a microtome blade (not shown) for forming a microscopic sample and differs from the first embodiment in the following point. Specifically, after a base plate 3 is finished through polishing, a cutting angle α defined by two surfaces 7, 8 is 30 to 40 degrees. A point 3*b* of the base plate 3 is formed along an arc having a radius of 2 to 3 nm. The film thickness of a non-nitrided layer 9, which is formed on the base plate 3, is 10 to 15 nm. The film thickness of a nitrided layer 12 provided on the non-nitrided layer 9 is 10 to 15 nm. The film thickness of a bonding layer 5 on the nitrided layer 12 is 1 to 4 nm. A fluororesin layer 6 is formed on the bonding layer 5.

Although the cutting edges 2 of the razor blade 1 or the microtome blade have been discussed in the illustrated embodiments, the present invention may be used in other blade members such as scalpels, scissors, kitchen knives, nail clippers, special cutters for industrial use, chisels, and pencil sharpeners.

The invention claimed is:

1. A blade member in which a surface of a base plate forming a cutting edge is coated with a coating layer, wherein the coating layer includes a non-nitrided layer coating the surface of the base plate and a nitrified layer coating a surface of the non-nitrided layer, and the non-nitrided layer and the nitrided layer have structures and compositions enhancing cutting performance of the cutting edge and improving durability of the cutting edge as defined below;

wherein the non-nitrified layer has a thickness of 30 to 70 nm and contains Ti, Al and Cr, wherein relative proportions of Ti, Al and Cr of the non-nitrided layer vary along a direction of a thickness of the non-nitrided layer, the Ti, Al and Cr are contained in the non-nitrided layer respectively by atomic ratios a, b and c, where a+b+c=1, and the atomic ratios a, b and c respectively for the Ti, Al and Cr contained in the non-nitrified layer satisfy the relationships: 0.25≤a≤015, 0.25≤b≤0.75 and c=0 in the range from the surface of the base plate to a point corresponding to the thickness of 5 to 20 nm, and the atomic ratios a, b and c respectively for Ti, Al and Cr contained in the non-nitrided layer satisfy the relationships: 0.2≤a≤0.30, 0.55≤b≤0.765 and 0.06≤c in the range corresponding to the thickness of 30 to 70 nm, wherein the nitride layer has a thickness of 50 to 90 nm and contains Ti, Al, Cr and N, wherein the relative proportion of Ti, Al, Cr and N is set constant at a predetermined depth from the surface of the nitrided layer, and the Ti, Al, Cr and N are contained in the nitrided layer respectively by atomic ratios a, b, c and d, where a+b+c=1, and the atomic ratios a, b, c and d respectively for Ti, Al, Cr and N contained in the nitrided layer satisfy the relationships: 0.2≤a≤0.30, 0.55≤b≤0.765, 0.06≤c and 0.5≤d≤1, wherein the ratio between the thickness of the nitrided layer and the thickness of the non-nitrided layer is in the range from 1:1 to 2:1 and the hardness of the nitrided layer is greater than the hardness of the non-nitrided layer.

2. The blade member according to claim 1, wherein neither the non-nitrided layer nor the nitrided layer contains O, B or C.

3. The blade member according to claim 1, wherein the width between surfaces of the base plate forming the cutting edge on opposite sides of the direction of the thickness of the base plate becomes smaller toward a point of the cutting edge, wherein, in the coating layer coating the two surfaces of the base plate, a portion of the nitrided layer is removed from at least one of both sides of the direction of the thickness such that the nitrided layer has a remaining layer including a surface extending from the point of the cutting edge.

4. The blade member according to claim 3, wherein the nitrided layer has a plurality of remaining layers that are stacked together.

5. The blade member according to claim 3, wherein at least one of opposite surfaces of the remaining layer of the nitrided layer is formed by a first surface and a second surface, the first surface extending from the point of the cutting edge and the second surface extending from the first surface, wherein a cutting edge angle defined by two first surfaces is greater than a cutting edge angle defined by two second surfaces.

6. The blade member according to claim 3, wherein the nitrided layer has a surface layer coating a surface of the remaining layer.

7. The blade member according to claim 1, wherein the width between surfaces of the base plate forming the cutting edge on both sides of the direction of the thickness of the base plate becomes smaller toward a point of the cutting edge, wherein a surface extending from the point of the cutting edge is formed by removing a portion of at least one of the two surfaces of the base plate.

8. The blade member according to claim 7, wherein at least one of the opposite surfaces of the base plate is formed by a first surface and a second surface, the first surface extending from the point of the cutting edge and the second surface extending from the first surface, wherein a cutting edge angle defined by two first surfaces is greater than a cutting edge angle defined by two second surfaces.

9. The blade member according to claim 1, wherein a fluororesin layer is provided on a surface side of the nitrided layer of the coating layer.

10. The blade member according to claim 9, wherein a surface of the nitrided layer is coated with a bonding layer and that the fluororesin layer coats a surface of the bonding layer.

11. The blade member according to claim 1, wherein the base plate is a base plate forming a cutting edge of a razor blade or a microtome blade.

12. The blade member according to claim 1, wherein the formation of the coating layer is performed through at least one of a sputtering method, a vapor deposition method, an ion plating method, and a chemical vapor deposition method.

13. A blade member comprising a base plate, the base plate having a surface forming a cutting edge, and the cutting edge including a plurality of coating layers forming the cutting edge, the coating layers including a non-nitrided layer on the surface of the base plate and a nitrided layer bonded to a surface of the non-nitrided layer, and the non-nitrided layer and the nitrided layer having structures and compositions, as defined below, that enhance cutting performance of the cutting edge and improve durability of the cutting edge;

the non-nitrided layer has a thickness of 30 to 70 nm and contains an alloy of Ti—Al—Cr represented by a formula of $Ti_aAl_bCr_c$ wherein:

a, b and c respectively represent atomic ratios of Ti, Al and Cr, a+b+c=1, relative proportions of Ti, Al and Cr of the non-nitrided layer vary along a direction of a thickness of the non-nitrided layer, and in the range from the surface of the base plate to a point corresponding to the thickness of 5 to 20 nm:

0.25≤a≤0.75, 0.25≤b≤0.75, and c=0, and in the range corresponding to the thickness of 30 to 70 nm:

0.2≤a≤0.30, 0.55≤b≤0.765, and 0.06≤c;

the nitride layer has a thickness of 50 to 90 nm and contains a nitride of the alloy of Ti—Al—Cr represented by a formula of $Ti_aAl_bCr_cN_d$ wherein:

a, b, c and d respectively represent atomic ratios of Ti, Al, Cr and N;

a+b+c=1; and a relative proportion of Ti, Al, Cr and N is set constant at a predetermined depth from the surface of the nitrided layer where:

0.2≤a≤0.30, 0.55≤b≤0.765, 0.06≤c, 0.5≤d≤1;

wherein the ratio between the thickness of the nitrided layer and the thickness of the non-nitrided layer is in the range from 1:1 to 2:1, and the hardness of the nitrided layer is greater than the hardness of the non-nitrided layer.

14. The blade member according to claim 13 further comprising a bonding layer formed of Cr or Al interposed between and bonding the nitrided layer and the non-nitrided layer.

* * * * *